(12) United States Patent
Linsky

(10) Patent No.: US 9,648,490 B2
(45) Date of Patent: May 9, 2017

(54) CONTEXT-AWARE MOBILE COMPUTING FOR AUTOMATIC ENVIRONMENT DETECTION AND RE-ESTABLISHMENT

(75) Inventor: Joel Benjamin Linsky, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 368 days.

(21) Appl. No.: 13/409,864

(22) Filed: Mar. 1, 2012

(65) Prior Publication Data

US 2013/0229929 A1 Sep. 5, 2013

(51) Int. Cl.
| | |
|---|---|
| *H04W 36/14* | (2009.01) |
| *H04W 8/18* | (2009.01) |
| *H04W 88/06* | (2009.01) |
| *H04W 84/12* | (2009.01) |

(52) U.S. Cl.
CPC ............ *H04W 8/18* (2013.01); *H04W 36/14* (2013.01); *H04W 88/06* (2013.01); *H04W 84/12* (2013.01)

(58) Field of Classification Search
USPC ....................................................... 370/252
See application file for complete search history.

(56) References Cited

U.S. PATENT DOCUMENTS

| | | | |
|---|---|---|---|
| 7,111,172 B1 | 9/2006 | Duane et al. | |
| 8,112,817 B2 | 2/2012 | Chiruvolu et al. | |
| 2004/0121793 A1* | 6/2004 | Weigele | H04W 52/0274 455/522 |
| 2006/0142004 A1* | 6/2006 | He | H04W 48/16 455/434 |
| 2006/0203738 A1* | 9/2006 | Fok | H04B 17/26 370/252 |
| 2008/0081605 A1* | 4/2008 | Cole | H04L 12/5692 455/424 |
| 2008/0209223 A1 | 8/2008 | Nandy et al. | |
| 2008/0233925 A1* | 9/2008 | Sun | H04L 67/12 455/414.1 |
| 2008/0244700 A1 | 10/2008 | Osborn et al. | |
| 2009/0284344 A1 | 11/2009 | Craymer et al. | |
| 2009/0300732 A1 | 12/2009 | Hwang et al. | |
| 2010/0043063 A1 | 2/2010 | Ueda et al. | |
| 2010/0099354 A1* | 4/2010 | Johnson | H04M 1/7253 455/41.1 |
| 2010/0107233 A1 | 4/2010 | Dillon et al. | |
| 2010/0281526 A1 | 11/2010 | Raghavan | |

(Continued)

OTHER PUBLICATIONS

International Search Report and Written Opinion—PCT/US2013/028397—ISA/EPO—Jun. 3, 2013.

*Primary Examiner* — Bunjob Jaroenchonwanit
(74) *Attorney, Agent, or Firm* — Kevin T. Cheatham

(57) ABSTRACT

Automatically discovering and re-establishing wireless connections to other devices in a mobile computing environment (MCE) may be achieved by monitoring connections of different devices with the UE, correlating the connections of the different devices, determining an MCE based on the correlations, and storing information associated with the MCE. A known MCE may accordingly be automatically detected based on an identification of at least one of the different devices, for example, and connection with one or more of the different devices may be automatically re-established to re-establish the MCE based on the stored information.

17 Claims, 10 Drawing Sheets

RE-ESTABLISHMENT WITH MCE

(56) References Cited

U.S. PATENT DOCUMENTS

| | | | |
|---|---|---|---|
| 2010/0318578 A1* | 12/2010 | Treu | G06F 19/3418 707/802 |
| 2011/0202981 A1 | 8/2011 | Tamai et al. | |
| 2011/0250875 A1* | 10/2011 | Huang | H04W 4/02 455/418 |
| 2011/0258314 A1* | 10/2011 | Hunter | H04L 12/2823 709/224 |
| 2012/0011564 A1 | 1/2012 | Osborn et al. | |
| 2012/0188991 A1* | 7/2012 | Kholaif | H04W 84/22 370/338 |
| 2013/0128873 A1* | 5/2013 | Eipe | H04W 76/02 370/338 |
| 2013/0182576 A1 | 7/2013 | Linsky | |
| 2013/0203432 A1* | 8/2013 | Wang | H04W 72/082 455/452.1 |
| 2013/0217332 A1* | 8/2013 | Altman | H04H 60/90 455/41.2 |

* cited by examiner

Work Environment

Home Environment

SETTING UP MCE

RE-ESTABLISHMENT WITH MCE

CONTEXT-AWARE MOBILE COMPUTING FOR AUTOMATIC ENVIRONMENT DETECTION AND RE-ESTABLISHMENT

BACKGROUND OF THE INVENTION

1. Field of the Invention

The field of the disclosure relates generally to wireless communication, and more particularly, to context-aware mobile computing.

2. Description of the Related Art

User equipment (UEs) may interact with different wireless communication systems and different associated devices depending upon the user's surroundings. There are presently many different types of wireless communication systems in use, including long range Cellular and Personal Communications Service (PCS) systems, and other shorter range technologies such as Bluetooth and Wi-Fi.

Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

UEs may also exchange data over shorter distances with other fixed and mobile devices in a Bluetooth wireless communication system. Bluetooth wireless communication systems use short wavelength radio transmissions in the Industrial, Scientific and Medical (ISM) band from 2400-2480 MHz. Bluetooth utilizes a frequency-hopping spread spectrum, in which data is exchanged on up to 79 bands (1 MHz each; centered from 2402 to 2480 MHz) in the range of 2400-2483.5 MHz (allowing for guard bands).

A Wi-Fi network may also be used to wirelessly connect electronic devices. Wi-Fi uses the IEEE 802.11 family of standards, and may require configuration to set up shared resources, transmit files, and to set up audio links (e.g., headsets and hands-free devices). Wi-Fi uses the same radio frequencies as Bluetooth, but with higher power, resulting in a faster connection and better range from the base station. For example, an access point may have a range of about 20 meters indoors and a greater range outdoors.

Conventionally, wireless connection re-establishment among devices in these systems has been performed ad-hoc. For example, UEs typically re-establish connections to a home Wi-Fi network, external monitor, stereo system, and other known devices within the user's environment on an individual and uncoordinated basis. Accordingly, there is a need in the art for improved re-establishment procedures that may reconnect more of the environment than a single connection at a time.

SUMMARY

Exemplary embodiments of the invention are directed to systems and methods for a user equipment (UE) to automatically discover and re-establish wireless connection to other devices in a mobile computing environment (MCE).

In some embodiments, a method is provided for connecting a UE. The method may comprise: monitoring connections of different devices with the UE; correlating the connections of the different devices; determining an MCE based on the correlations; and storing information associated with the MCE.

In other embodiments, a UE is provided. The UE may comprise: logic configured to monitor connections of different devices with the UE; logic configured to correlate the connections of the different devices; logic configured to determine an MCE based on the correlations; and memory configured to store information associated with the MCE.

In still other embodiments, an apparatus is provided for connecting a UE. The apparatus may comprise: means for monitoring connections of different devices with the UE; means for correlating the connections of the different devices; means for determining an MCE based on the correlations; and means for storing information associated with the MCE.

In still other embodiments, a computer-readable storage medium containing instructions stored thereon is provided, which, when executed by at least one processor causes the at least one processor to perform operations for connecting a UE. The instructions may comprise: instructions to monitor connections of different devices with the UE; instructions to correlate the connections of the different devices; instructions to determine an MCE based on the correlations; and instructions to store information associated with the MCE.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
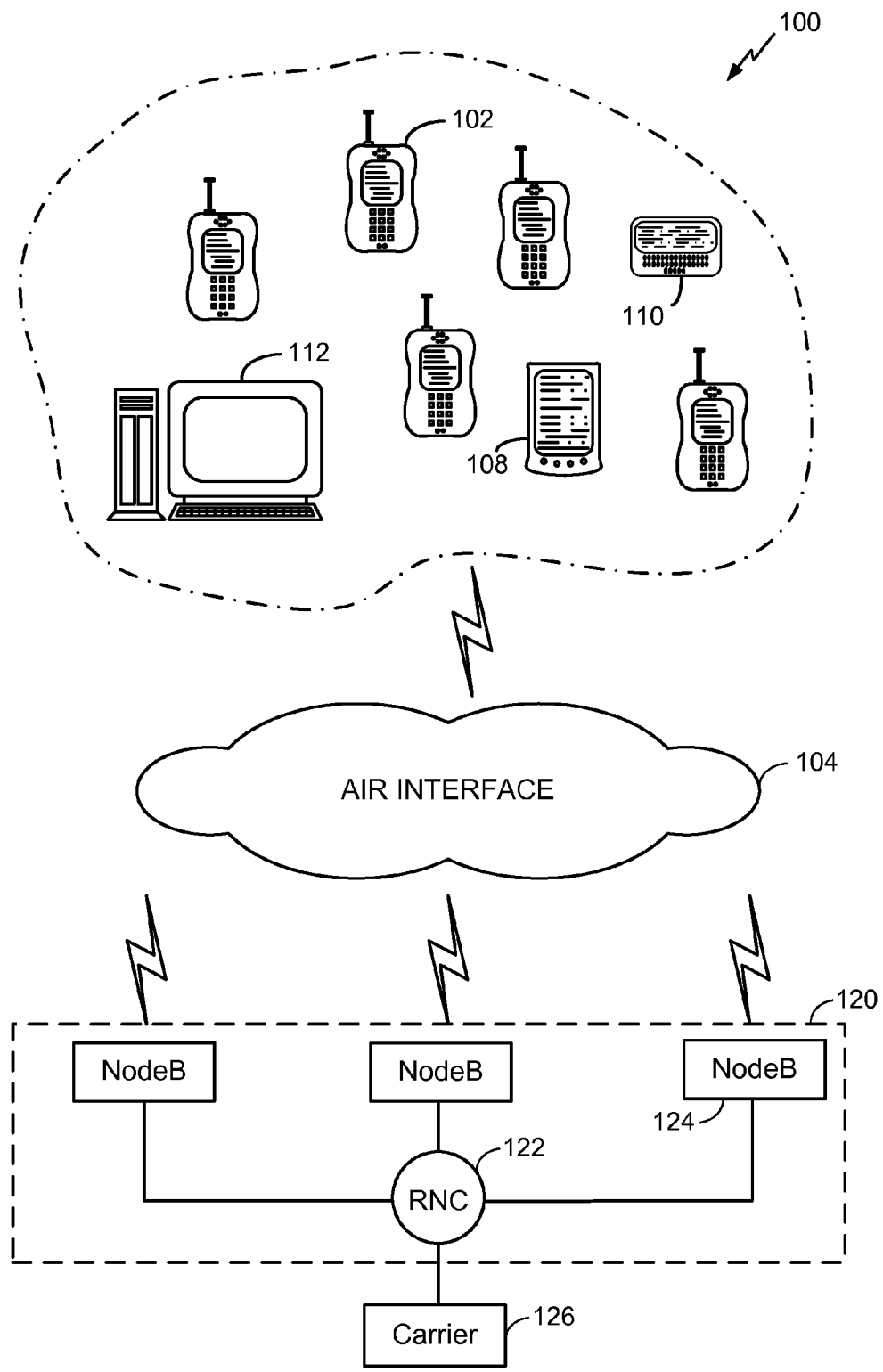
FIG. 1 is a diagram of a wireless network architecture that supports access terminals and access networks in accordance with at least one embodiment.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation. It will be further understood that the term wireless technology may include but is not limited to: Wireless Wide Area Networks (e.g., CDMA, GSM, WCDMA, LTE), Wi-Fi technologies (e.g., 802.11a/b/g/n, WPA, WEP), Authentication methods (e.g., 802.1x, EAP methods), WiMAX technologies (e.g., 802.16e, X509 certificates), Dial-Up connection, Remote Access connection, handset connection (e.g., Bluetooth, Infrared, USB), and hotspot connections.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein may be performed by specific circuits (e.g., application specific integrated circuits (ASICs)), by program instructions being executed by one or more processors, or by a combination of both. Additionally, these sequence of actions described herein may be considered to be embodied entirely within any form of computer readable storage medium having stored thereon a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

User equipment (UE), as used herein, may be mobile or stationary, may or may not communicate with one or more access points (APs), which may be referred to as Node Bs, or other wireless devices as described more fully below. A UE may be configured, in some embodiments, to transmit and receive data packets through one or more of the Node Bs to a Radio Network Controller (RNC). The Node Bs and RNC are parts of a network called a radio access network (RAN). A radio access network may transport voice and data packets between multiple access terminals.

The radio access network may be further connected to additional networks outside the radio access network, such a core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and may be referred to as being in a traffic state. A UE that is in the process of establishing an active traffic channel (TCH) connection with one or more Node Bs may be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.). As used herein the term traffic channel (TCH) may refer to either an uplink/reverse or downlink/forward traffic channel.

FIG. 1 illustrates a block diagram of an example wireless communications system 100. System 100 may contain UEs, such as cellular telephone 102, in communication across an air interface 104 with an access network or radio access network (RAN) 120 that may connect the UE 102 to network equipment providing data connectivity between a packet switched data network (e.g., an intranet, the Internet, and/or core network 126) and the UEs 102, 108, 110, 112. As shown here, the UE may be a cellular telephone 102, a personal digital assistant 108, a pager 110, which is shown here as a two-way text pager, or even a separate computer platform 112 that has a wireless communication portal. Embodiments of the invention may thus be realized on any form of UE including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal," "AT," "wireless device," "client device," "mobile terminal," "mobile station," or variations thereof.

Referring back to FIG. 1, the components of the wireless communications system 100 and interrelation of the elements therein are not limited to the configuration illustrated. System 100 is merely exemplary and may include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to an RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 may be connected to multiple Node Bs 124. In a similar manner to the core network 126, the RNC 122 is typically connected to the Node Bs 124 by a network, the Internet and/or PSTN for data transfer and/or voice information. The Node Bs 124 may broadcast data messages wirelessly to the UEs, such as cellular telephone 102. The Node Bs 124, RNC 122 and other components may form the RAN 120, as is known in the art. However, alternate configurations may also be used. For example, the functionality of the RNC 122 and one or more of the Node Bs 124 may be collapsed into a single "hybrid" module having the functionality of both the RNC 122 and the Node B(s) 124.

Figure 2A:
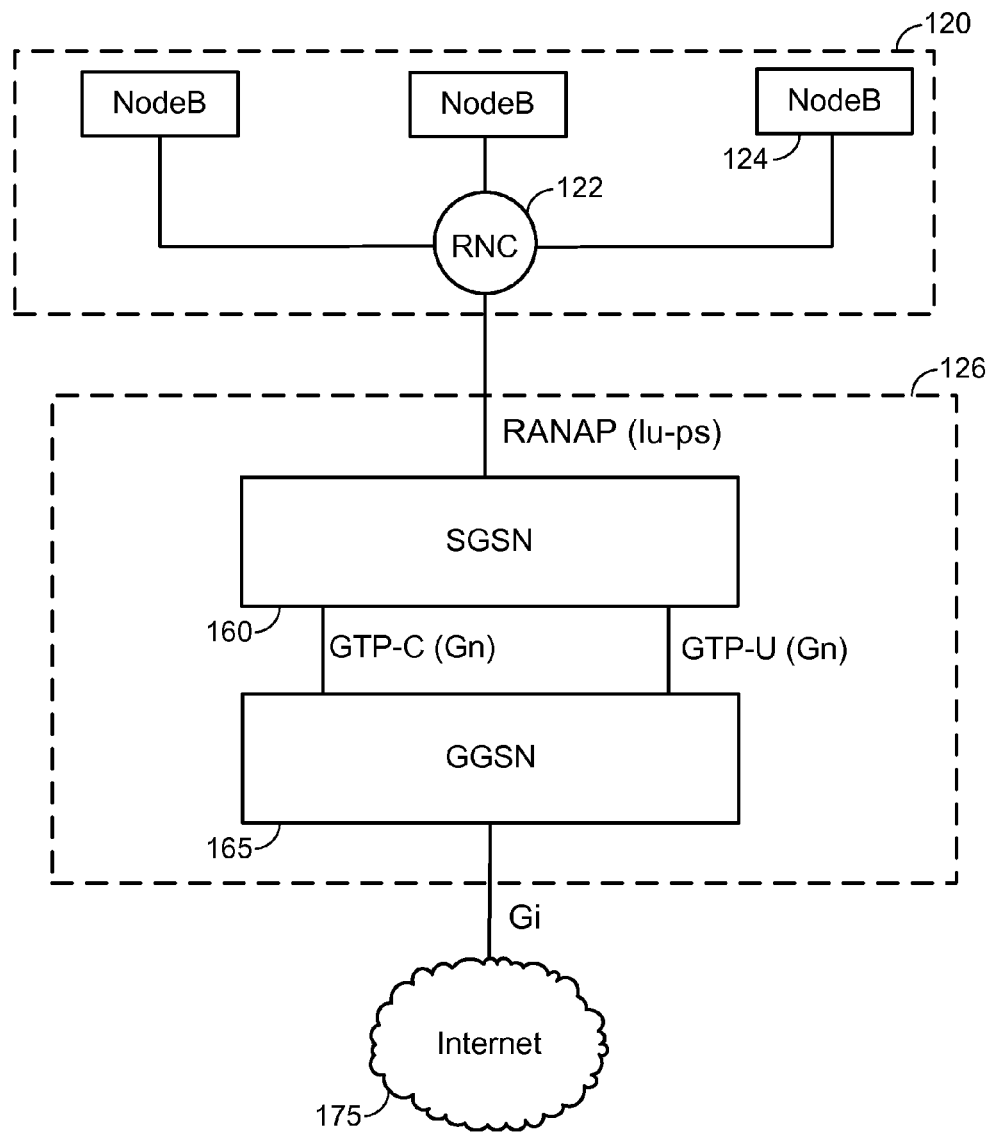
FIG. 2A illustrates the core network of FIG. 1 according to an embodiment.

FIG. 2A illustrates the core network 126 in one design. In particular, FIG. 2A illustrates components of a General Packet Radio Services (GPRS) core network implemented within a W-CDMA system. In the design of FIG. 2A, the core network 126 includes a Serving GPRS Support Node (SGSN) 160, a Gateway GPRS Support Node (GGSN) 165 and an Internet 175. However, it is to be appreciated that portions of the Internet 175 and/or other components may be located outside the core network in alternative designs.

Generally, GPRS is a protocol used by Global System for Mobile communications (GSM) phones for transmitting Internet Protocol (IP) packets. The GPRS Core Network (e.g., the GGSN 165 and one or more SGSNs 160) is the centralized part of the GPRS system and also provides support for W-CDMA based 3G networks. The GPRS core network is an integrated part of the GSM core network, provides mobility management, session management and transport for IP packet services in GSM and W-CDMA networks.

The GPRS Tunneling Protocol (GTP) is the defining IP protocol of the GPRS core network. The GTP is the protocol which allows end users (e.g., UEs) of a GSM or W-CDMA network to move from place to place while continuing to connect to the internet as if from one location at the GGSN 165. This is achieved transferring the subscriber's data from the subscriber's current SGSN 160 to the GGSN 165, which is handling the subscriber's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2A, the GGSN 165 acts as an interface between the GPRS backbone network (not shown) and the external packet data network 175. The GGSN 165 extracts the packet data with associated packet data protocol (PDP) format (e.g., IP or PPP) from the GPRS packets coming from the SGSN 160, and sends the packets out on a corresponding packet data network. In the other direction, the incoming data packets are directed by the GGSN 165 to the SGSN 160 which manages and controls the Radio Access Bearer (RAB) of the destination UE served by the RAN 120. Thereby, the GGSN 165 stores the current SGSN address of the target UE and his/her profile in its location register (e.g., within a PDP context). The GGSN is responsible for IP address assignment and is the default router for the connected UE. The GGSN also performs authentication and charging functions.

The SGSN 160 is representative of one of many SGSNs within the core network 126, in an example. Each SGSN is responsible for the delivery of data packets from and to the UEs within an associated geographical service area. The tasks of the SGSN 160 includes packet routing and transfer, mobility management (e.g., attach/detach and location management), logical link management, and authentication and charging functions. The location register of the SGSN stores location information (e.g., current cell, current VLR) and user profiles (e.g., IMSI, PDP address(es) used in the packet data network) of all GPRS users registered with the SGSN 160, for example, within one or more PDP contexts for each user or UE. Thus, SGSNs are responsible for (i) de-tunneling downlink GTP packets from the GGSN 165, (ii) uplink tunnel IP packets toward the GGSN 165, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in Universal Mobile Telecommunications System (UMTS) system architecture) communicates with the SGSN 160 via a Radio Access Network Application Part (RANAP) protocol. RANAP operates over an Iu interface (Iu-ps), with a transmission protocol such as Frame Relay or IP. The SGSN 160 communicates with the GGSN 165 via a Gn interface, which is an IP-based interface between SGSN 160 and other SGSNs (not shown) and internal GGSNs, and uses the GTP protocol defined above (e.g., GTP-U, GTP-C, GTP', etc.). In the design of FIG. 2A, the Gn between the SGSN 160 and the GGSN 165 carries both the GTP-C and the GTP-U. While not shown in FIG. 2A, the Gn interface is also used by the Domain Name System (DNS). The GGSN 165 is connected to a Public Data Network (PDN) (not shown), and in turn to the Internet 175, via a Gi interface with IP protocols either directly or through a Wireless Application Protocol (WAP) gateway.

Figure 2B:
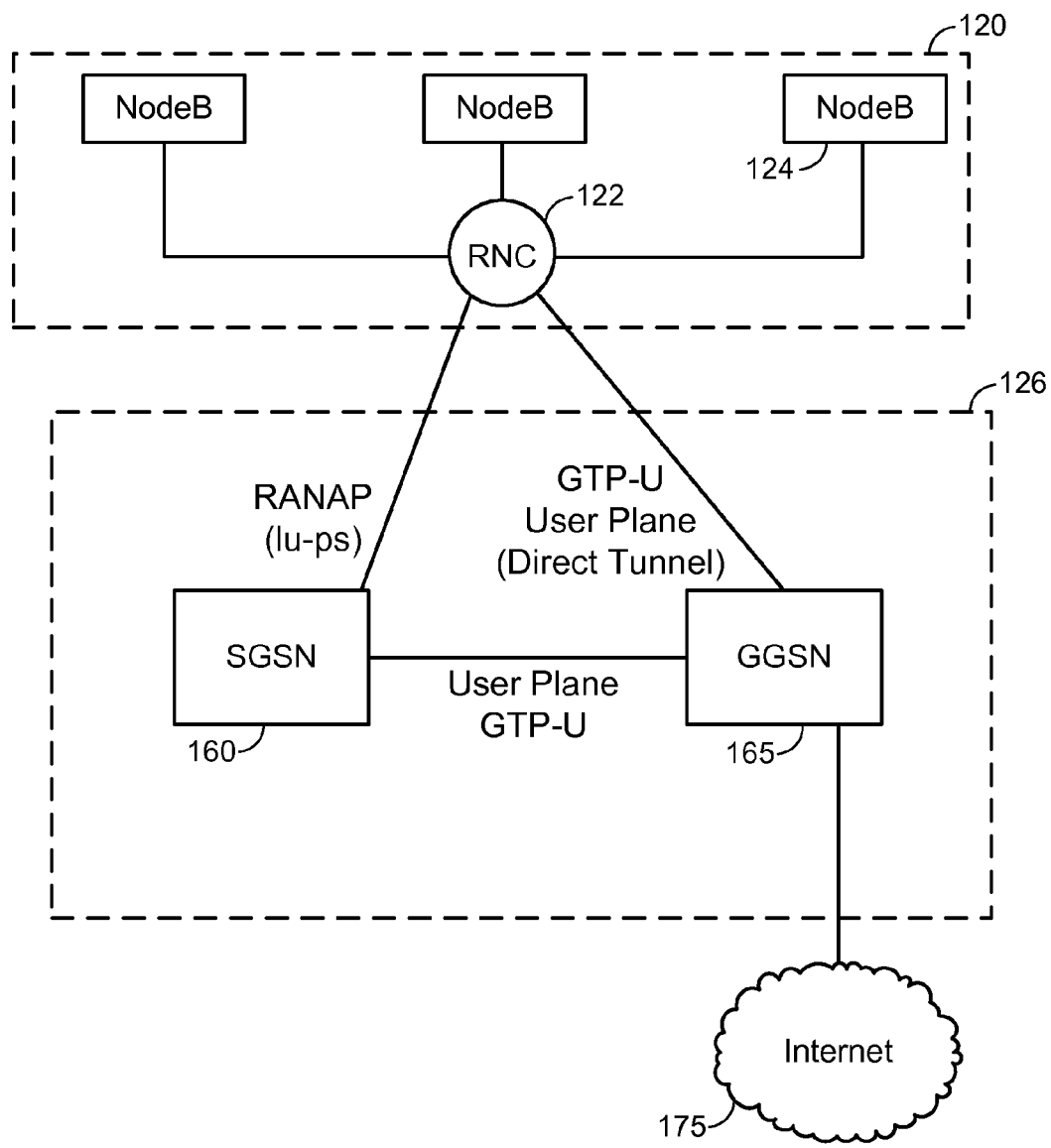
FIG. 2B illustrates the core network of FIG. 1 according to another embodiment.

FIG. 2B illustrates the core network 126 according to another design. FIG. 2B is similar to FIG. 2A except that FIG. 2B illustrates an implementation of direct tunnel functionality.

Direct Tunnel is an optional function in Iu mode that allows the SGSN 160 to establish a direct user plane tunnel, GTP-U, between RAN and GGSN within the Packet Switched (PS) domain. A direct tunnel capable SGSN, such as SGSN 160 in FIG. 2B, may be configured on a per GGSN and per RNC basis whether or not the SGSN may use a direct user plane connection. The SGSN 160 in FIG. 2B handles the control plane signaling and makes the decision of when to establish Direct Tunnel. When the Radio Bearer (RAB) assigned for a PDP context is released (i.e. the PDP context is preserved) the GTP-U tunnel is established between the GGSN 165 and SGSN 160 in order to be able to handle the downlink packets.

The optional Direct Tunnel between the SGSN 160 and GGSN 165 is not typically allowed (i) in the roaming case (e.g., because the SGSN needs to know whether the GGSN is in the same or different PLMN), (ii) where the SGSN has received Customized Applications for Mobile Enhanced Logic (CAMEL) Subscription Information in the subscriber profile from a Home Location Register (HLR) and/or (iii) where the GGSN 165 does not support GTP protocol version 1. With respect to the CAMEL restriction, if Direct Tunnel is established then volume reporting from SGSN 160 is not possible as the SGSN 160 no longer has visibility of the User Plane. Thus, since a CAMEL server may invoke volume reporting at anytime during the life time of a PDP Context, the use of Direct Tunnel is prohibited for a subscriber whose profile contains CAMEL Subscription Information.

The SGSN 160 may be operating in a Packet Mobility Management (PMM)-detached state, a PMM-idle state or a PMM-connected state. In an example, the GTP-connections shown in FIG. 2B for Direct Tunnel function may be established whereby the SGSN 160 is in the PMM-connected state and receives an Iu connection establishment request from the UE. The SGSN 160 ensures that the new Iu connection and the existing Iu connection are for the same UE, and if so, the SGSN 160 processes the new request and releases the existing Iu connection and all RABs associated with it. To ensure that the new Iu connection and the existing one are for the same UE, the SGSN 160 may perform security functions. If Direct Tunnel was established for the UE, the SGSN 160 sends an Update PDP Context Request(s) to the associated GGSN(s) 165 to establish the GTP tunnels between the SGSN 160 and GGSN(s) 165 in case the Iu connection establishment request is for signaling only. The SGSN 160 may immediately establish a new direct tunnel and send Update PDP Context Request(s) to the associated GGSN(s) 165 and include the RNC's Address for User Plane, a downlink Tunnel Endpoint Identifier (TEID) for data in case the Iu connection establishment request is for data transfer.

The UE also performs a Routing Area Update (RAU) procedure immediately upon entering PMM-IDLE state when the UE has received a RRC Connection Release message with cause "Directed Signaling connection re-establishment" even if the Routing Area has not changed since the last update. In an example, the RNC will send the RRC Connection Release message with cause "Directed Signaling Connection re-establishment" when it the RNC is unable to contact the Serving RNC to validate the UE due to lack of Iur connection (e.g., see TS 25.331[52]). The UE performs a subsequent service request procedure after successful completion of the RAU procedure to re-establish the radio access bearer when the UE has pending user data to send.

The PDP context is a data structure present on both the SGSN 160 and the GGSN 165 which contains a particular UE's communication session information when the UE has an active GPRS session. When a UE wishes to initiate a GPRS communication session, the UE must first attach to the SGSN 160 and then activate a PDP context with the GGSN 165. This allocates a PDP context data structure in the SGSN 160 that the subscriber is currently visiting and the GGSN 165 serving the UE's access point.

Figure 2C:
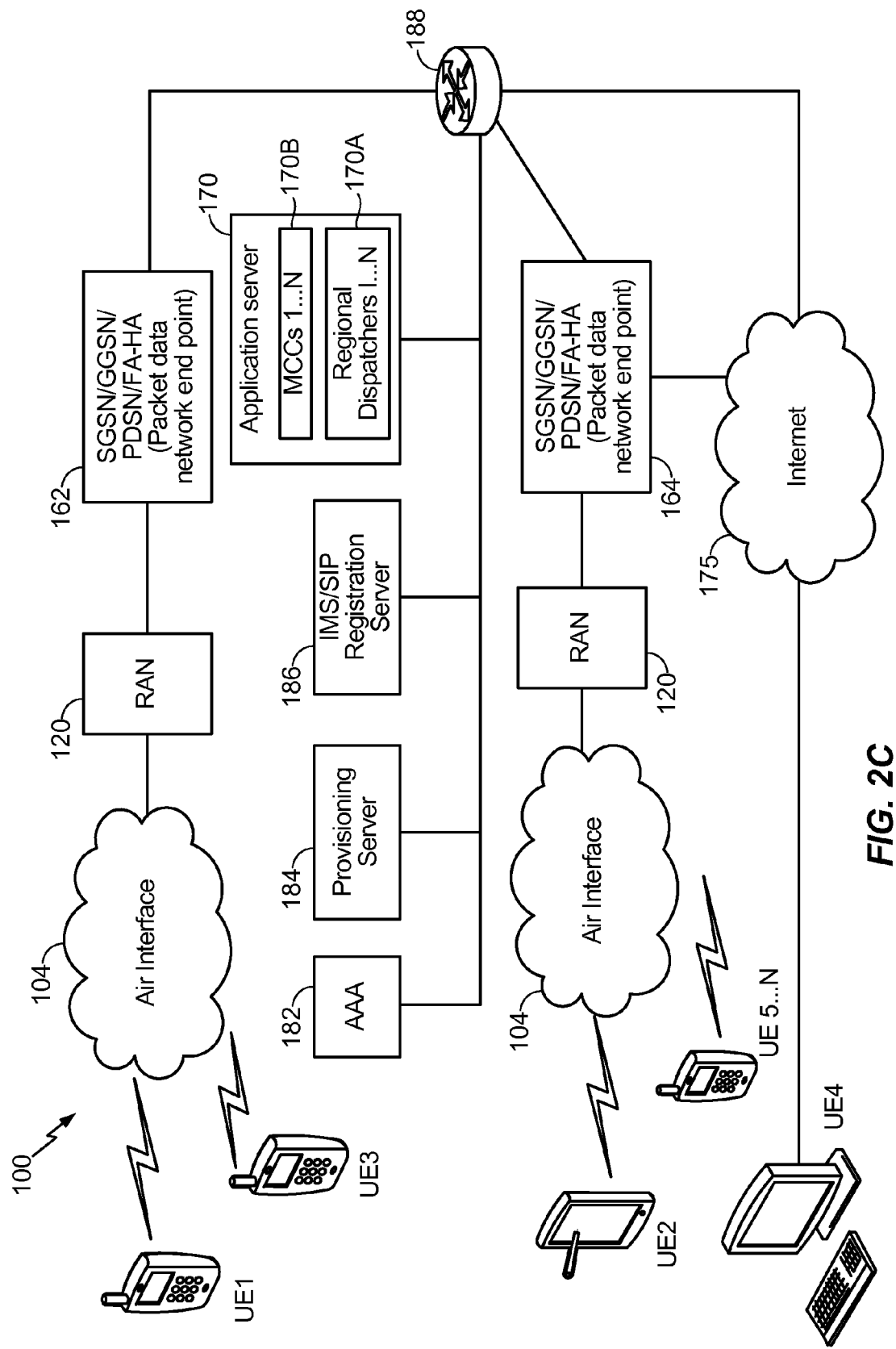
FIG. 2C illustrates an example of the wireless communication system of FIG. 1 in more detail.

FIG. 2C illustrates an example of the wireless communications system 100 of FIG. 1 in more detail. In particular, referring to FIG. 2C, UEs 1 . . . N are shown as connecting to the RAN 120 at locations serviced by different packet data network end-points. The illustration of FIG. 2C is specific to W-CDMA systems and terminology, although it will be appreciated how FIG. 2C could be modified to confirm with a 1×EV-DO system. Accordingly, UEs 1 and 3 connect to the RAN 120 at a portion served by a first packet data network end-point 162 (e.g., which may correspond to SGSN, GGSN, PDSN, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. UEs 2 and 5 . . . N connect to the RAN 120 at a portion served by a second packet data network end-point 164 (e.g., which may correspond to SGSN, GGSN, PDSN, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. UE 4 connects directly to the Internet 175, and through the Internet 175 may then connect to any of the system components described above.

Referring to FIG. 2C, UEs 1, 3 and 5 . . . N are illustrated as wireless cell-phones, UE 2 is illustrated as a wireless tablet-PC and UE 4 is illustrated as a wired desktop station. However, it will be appreciated that the wireless communication system 100 may connect to any type of UE, and the examples illustrated in FIG. 2C are not intended to limit the types of UEs that may be implemented within the system. Also, while the AAA 182, the provisioning server 184, the IMS/SIP registration server 186 and the application server 170 are each illustrated as structurally separate servers, one or more of these servers may be consolidated.

Further, referring to FIG. 2C, the application server 170 is illustrated as including a plurality of media control complexes (MCCs) 1 . . . N 170B, and a plurality of regional dispatchers 1 . . . N 170A. Collectively, the regional dispatchers 170A and MCCs 170B are included within the application server 170, which may correspond to a distributed network of servers that collectively functions to arbitrate communication sessions (e.g., half-duplex group communication sessions via IP unicasting and/or IP multicasting protocols) within the wireless communication system 100. For example, because the communication sessions arbitrated by the application server 170 may theoretically take place between UEs located anywhere within the system 100, multiple regional dispatchers 170A and MCCs are distributed to reduce latency for the arbitrated communication sessions (e.g., so that a MCC in North America is not relaying media back-and-forth between session participants located in China). Thus, when reference is made to the application server 170, it will be appreciated that the associated functionality may be enforced by one or more of the regional dispatchers 170A and/or one or more of the MCCs 170B. The regional dispatchers 170A are generally responsible for any functionality related to establishing a communication session (e.g., handling signaling messages between the UEs, scheduling and/or sending announce messages, etc.), whereas the MCCs 170B are responsible for hosting the communication session for the duration of the call instance, including conducting an in-call signaling and an actual exchange of media during an arbitrated communication session.

Figure 3:
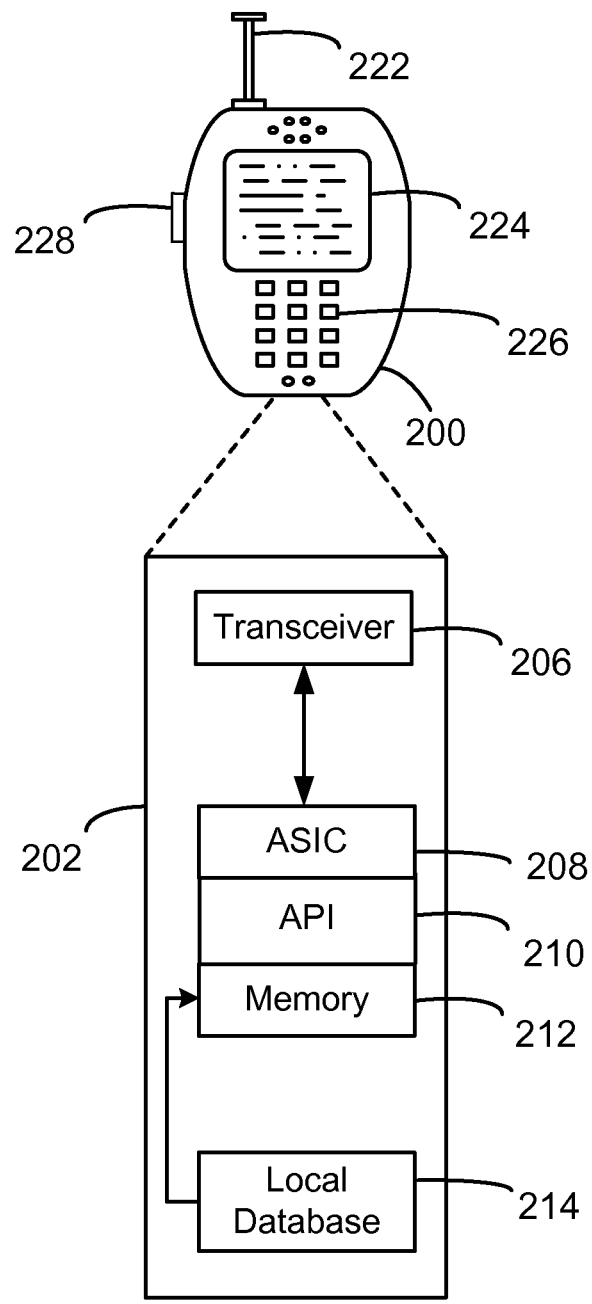
FIG. 3 illustrates a communication device that includes logic configured to perform functionality in accordance with at least one embodiment of the invention.

Referring to FIG. 3, a UE 200, (here a wireless device), such as a cellular telephone, has a platform 202 that may receive and execute software applications, data and/or commands transmitted from the RAN 120 that may ultimately come from the core network 126, the Internet and/or other remote servers and networks. The platform 202 may include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 may be comprised of read-only or random-access memory (RAM and ROM), EEPROM, flash cards, or any memory common to computer platforms. The platform 202 also may include a local database 214 that may hold applications not actively used in memory 212. The local database 214 is typically a flash memory cell, but may be any secondary storage device known in the art, such as magnetic media, EEPROM, optical media, tape, soft or hard disk, or the like. The internal platform 202 components may also be operably coupled to external devices such as antenna 222, display 224, push-to-talk button 228 and keypad 226 among other components, as is known in the art.

Accordingly, an embodiment of the invention may include a UE having the ability to perform the functions described herein. As will be appreciated by those skilled in the art, the various logic elements may be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UE 200 in FIG. 3 are to be considered merely illustrative and the invention is not limited to the illustrated features or arrangement.

In general, UEs such as the UE 200 discussed above may interact with other electronic devices in a variety of what are termed herein as "mobile computing environments" (MCEs). Some MCEs may be simple (e.g., a phone and headset), whereas other MCEs may be complex (e.g., a work or home desktop). Several example MCEs are described below for illustration.

Figure 4:
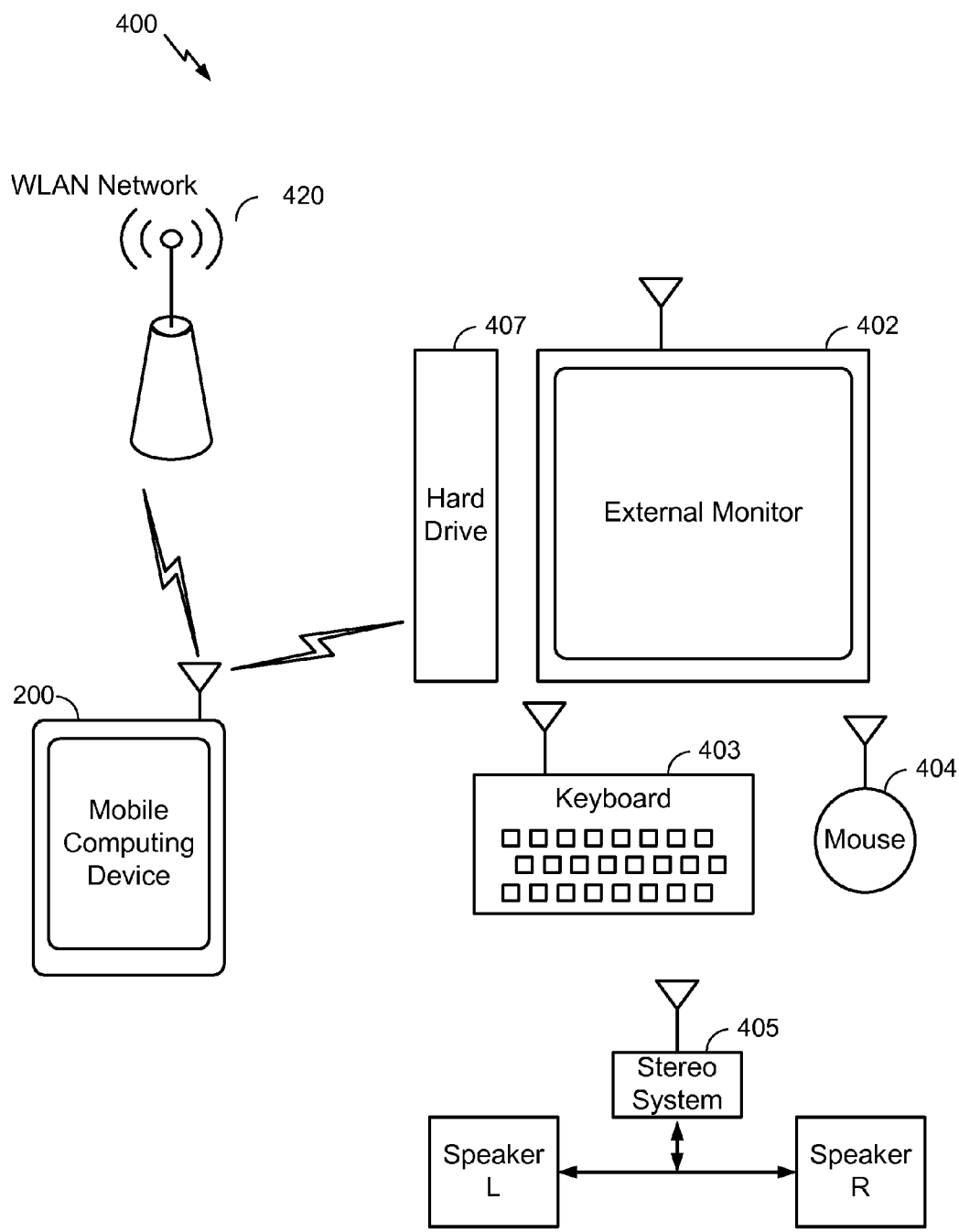
FIG. 4 illustrates an example work environment MCE according to one embodiment.

FIG. 4 illustrates an example work environment 400. In accordance with various embodiments, the UE may communicate with various wireless devices using different wireless technologies. In this example, the UE 200 may connect (e.g., using Bluetooth technology or the like) to various user devices including an external monitor 402, a keyboard 403, a mouse 404, a stereo system 405, a hard drive 407, etc. In addition, the UE 200 may connect to a work WLAN network 420 (e.g., Wi-Fi) and/or a WWAN network (e.g., 3G) of the type described above (not shown).

Figure 5:
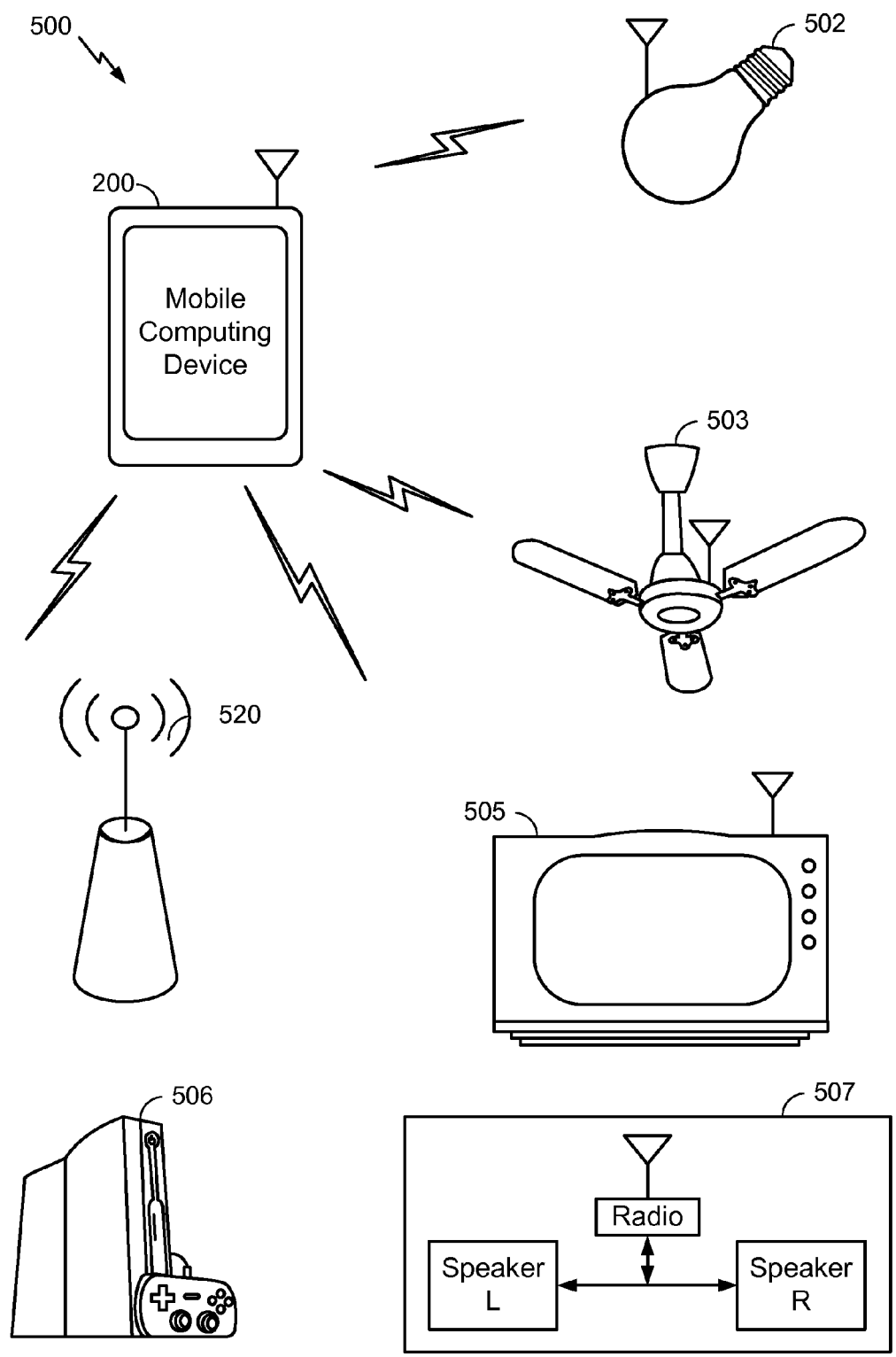
FIG. 5 illustrates an example home environment MCE according to one embodiment.

FIG. 5 illustrates an example home environment 500. In this example, the UE 200 may connect (e.g., using Bluetooth technology or the like) to home lighting 502, an HVAC system 503, a home WLAN network 520, a TV 505, a video game console 506, a stereo system 507, etc.

Other environments include a user's automobile or car, an office conference room, and others. In the car environment example, the UE may connect to an integrated hands-free system, an entertainment system, a navigation system, and/or other wireless devices. In the conference room example, the UE may connect to an external wireless projector, a sound system, a printer, one or more computers, and/or other wireless devices.

It will be appreciated that each MCE may have some similar devices and some unique devices. Each of these environments may contain a number of individual devices functioning together as a complete environment ecosystem.

By monitoring connections of different devices with the UE, and correlating the connections of the different devices, embodiments herein allow the UE to determine an MCE (e.g., a work MCE or a home MCE) based on the correlations. As discussed in more detail below, the correlations may be based on obtaining historical information regarding the UE's various connections with the different devices.

Additionally, the UE may be configured to automatically detect a known MCE defined for given environment, and automatically re-establish a connection with one or more of the different devices to re-establish the appropriate computing environment. Detection of the MCE may be based on an identification of at least one of the different devices in that MCE, such as by a MAC address, device ID, Bluetooth device address, network SSID, IP address, cell tower address, or other identifier. Alternatively, MCE detection may be based on a GPS location and/or other location based services. In some embodiments, the UE may disable at least one RF device on the UE, in order to save power.

Accordingly, embodiments herein may simplify the wireless reconnection experience by making the UE "context aware" so that users may avoid having to manually reconnect various devices to their UE. In mobile computing, context awareness refers to the idea that a UE may both monitor and react based on its environment. A context aware UE may have information about the surrounding circumstances and react accordingly based on pre-defined rules and triggering events. By automatically sensing and re-establishing connections in specific MCEs, a more seamless interaction with the devices making up a given MCE may be realized without the need for user input.

Figure 6:
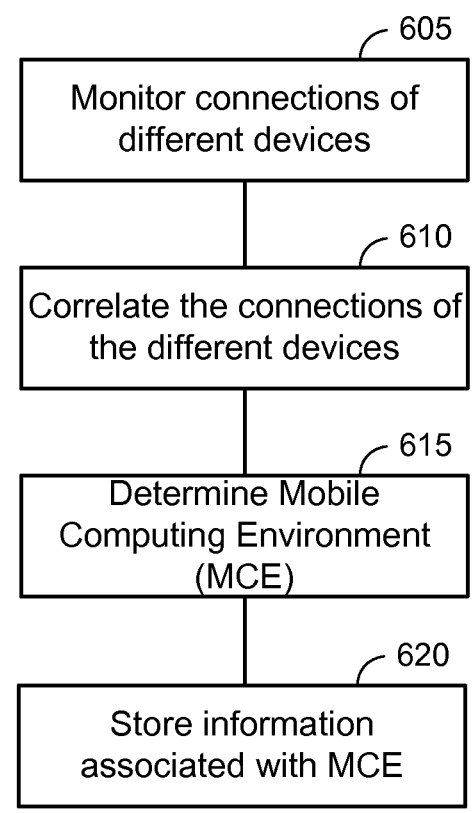
FIG. 6 illustrates an example method of setting up an MCE for future automatic connections according to one embodiment.

FIG. 6 illustrates an example method of setting up an MCE for future automatic connections.

As shown, a UE monitors connections of different devices (block 605) to sense the context of its surrounding environment. For example, a user may arrive at a new home environment such as the one shown in FIG. 5. Then, when the user turns on his or her UE, the UE may start to search for available Wi-Fi networks. Upon discovering the SSID or the MAC_ADDR of the WLAN 520 for the new environment, the UE may monitor other connections for potentially determining a new MCE. For example, while in this new environment, the UE may detect a radio signal and unique identifier from the wireless home lighting 502.

While the UE is monitoring the context of this new environment, the UE may correlate the various connections of different devices (block 610). In some embodiments, the UE may correlate the connections of the different devices over time to obtain historical information regarding the interactions and connections with the different devices. This correlation may be simultaneous with the monitoring of block 605. Alternatively, the correlation may also be based on other information received by the UE as part of or separate from block 605.

Using the correlations, the UE may determine its MCE (615) and store information associated with that MCE (block 620). The stored MCE information may include an identification associated with the MCE as well as other information that is received by the UE, both in the process of monitoring and correlating the various device connections, and otherwise. For example, the UE may also associate a physical location with the MCE based on a GPS location, a location provided via a WWAN, and/or other location services. The user may label each MCE, automatically or manually, with a unique classification (e.g., work, home, car, etc.).

Once an MCE has been determined and associated information stored, future connection of the UE to any of the devices in this known MCE may be automated based on information gathered from a user's surroundings.

Figure 7:
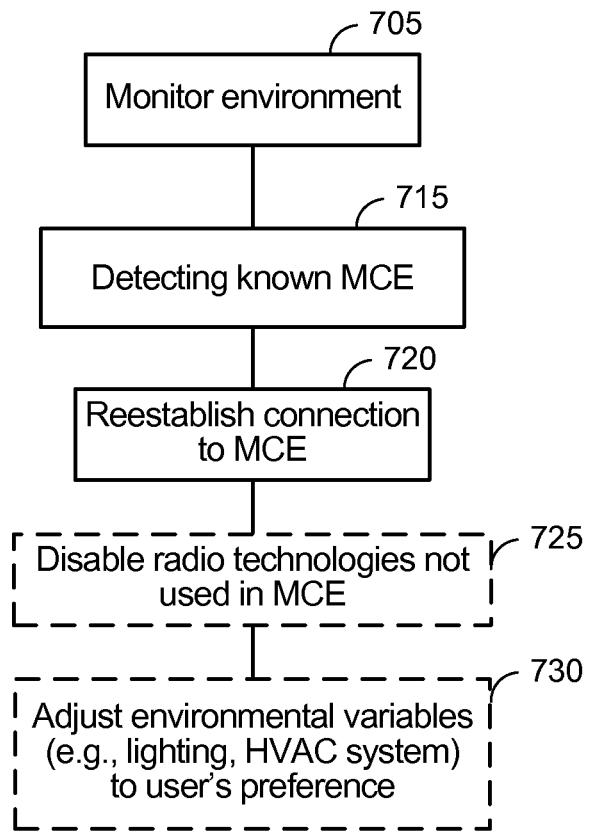
FIG. 7 illustrates an example re-establishment process for a known MCE according to one embodiment.

FIG. 7 illustrates an example re-establishment process for a known MCE. By simplifying the wireless reconnection experience, users may avoid having to manually reconnect all of their devices to their UE.

As shown, the UE initially monitors its environment (block 705). The monitoring may include monitoring connections of different devices, information about the user, the user's social environment, and/or the user's tasks. Additionally, the UE may monitor the user's physical environment (e.g., location, velocity), communications, and/or other conditions (e.g., noise, light).

Based on the UE's environment, the UE may automatically detect whether it is in a known MCE (block 715). For example, the UE may detect a known MCE based on an identification of at least one of the different devices and/or locations associated with the MCE. Alternatively, the UE may determine a known MCE based on information received about the user, the user's social environment, the user's tasks, physical environment (e.g., location, velocity), communications, and/or other conditions received by the UE (e.g., noise, light).

In some embodiments, the UE may detect previously known MCEs via a set of device identification numbers associated with one or more devices in or around the MCE. The device identification numbers may be MAC addresses or other IDs of various devices, Bluetooth device addresses, network SSIDs, IP addresses, cell tower addresses, or other unique identifiers.

For example, a user may arrive at his or her home environment, such as the home environment depicted in FIG. 5, and the UE may search for available Wi-Fi networks. Upon discovering the SSID, MAC address, or IP address of the WLAN 520 for the home environment, the UE may determine that it is in the home MCE. As another example, the UE may detect the radio signal from the wireless home lighting 502, and from the unique identifier of the wireless home lighting, the UE may recognize that it has entered the MCE for the home environment.

In the car environment example, the user may turn on the ignition of his or her vehicle, prompting the vehicle's hands-free system to attempt to connect with the UE. From this connection of the hands-free system, the UE may recognize that it is in a known car MCE. As another example, the UE may determine that it is moving based on the UE's connection to different RANs in a WWAN. If the UE determines that it is moving at a high speed (e.g., 60 miles per hour or higher), the UE may assume that it is in a car MCE.

In other embodiments, the UE may detect a known MCE by using location technology, such as GPS location mapping or other services using WWAN. For example, the UE may detect that it is in a conference room via a GPS location previously associated with the conference room.

In still other embodiments, the UE may detect a known MCE based on communications by the user. For example, the user may state on the UE's microphone that user is at home. As another example, the UE may detect a known MCE based on other noises, such as the vibration of a train.

In still other embodiments, the UE may monitor information about the user (e.g., knowledge of habits, physical conditions, bio-sensors), the user's social environment (e.g., co-location of others, social interaction, group dynamics), and/or the user's tasks (e.g., location-specific calendar events). For example, the UE may determine that it is in a known MCE based on information received from a social networking application. As another example, the UE may determine that it is in a known MCE based on a calendar event showing that the user is at work in a meeting.

Accordingly, it will be appreciated that detection of a known MCE may be achieved in many ways according to various triggering conditions or triggering events, including a detection of a known device (e.g., via Bluetooth), attachment of a UE to another device or network (e.g., WLAN), entering a known geophysical location (e.g., GPS), UE sensor detection, time-based events (e.g., email calendar events), user input, and others. The UE may store key identifiers that allow recognition of such triggering events, as necessary.

Once detection of a known MCE occurs, the UE may re-establish the expected connections that are associated with that MCE (block 720). Re-establishment may include requesting, activating, controlling, deactivating, connecting, and/or disconnecting other devices when the appropriate triggering event occurs. The UE may also launch various applications based on the recognized environment.

For example, in the work environment illustrated in FIG. 4, once the UE determines that the user is in the work MCE, the UE may automatically re-establish connections to the other known devices in this environment, such as the monitor 402, keyboard 403, mouse 404, stereo system 405 and/or a hard drive 407. The UE may determine, either automatically via previous interactions or manually via user programming, which other device connections should be automatically re-established for this environment.

As another example, in the home environment illustrated in FIG. 5, once the UE determines that the user is in the home MCE (e.g., by connecting to the home Wi-Fi network 520, etc.), the UE may re-establish connections with the other devices in the home MCE (e.g., the TV 505, game system 506, stereo system 507, etc.), adjust the home lighting 502, adjust the HVAC system 503, or perform other operations appropriate for the home environment. It should be appreciated that the re-established connections may not all be direct connections to the UE.

As another example, once the UE determines that the user is in the user's conference room (e.g., using GPS or other location based services, etc.), the UE may automatically re-establish connections to devices that are known to the UE to be located in the conference room. For example, the UE may request, or prompt the user to request, permission to connect to the external wireless projector.

The UE may also configure or modify other active devices in the environment using data communication and/or configuration data. For example, the UE may behave intelligently by installing any needed software or updates for connecting to a device via known technology such as plug-and-play technology. In this way, reconfiguration of a device connected to the UE may be made more seamless to a user, since the UE automatically connects and, if needed, reconfigures devices to allow for seamless re-establishment. This also provides a common device installation process, regardless of the particular devices, manufacturers, or operating systems. This also enables conflict management to ensure smooth operation of the UE.

The UE may also perform one or more security procedures, such as authentication, that may be required to access shared network devices. The UE may store user-based authentication information, per the request of the user, to allow for automatic re-establishment of devices that require authentication. For example, the UE may store security settings of known MCEs in order to facilitate re-connection to a known WLAN or a known WWAN. Alternatively, the user may choose to be prompted to type his or her password when re-establishing a secure connection. By storing these security settings, embodiments herein again allow for a more seamless wireless connection to known MCE environments.

In some embodiments, the UE may be configured for operation with multiple users. For example, based on a bio-sensor (e.g., fingerprint reader to login to UE), the UE may determine that a second known user is currently utilizing the UE, and accordingly re-establish reconnections in accordance with the second user's preference for a specific MCE.

Optionally, the UE may disable radio technologies not used in the detected MCE to save power (block 725). For example, when the UE determines that the location is the user's car, the UE may disable radio technologies that are not necessary in the car (e.g., WLAN) in order to save power. As another example, if the UE determines that it is moving at a high rate of speed (e.g., based on internal sensors, based on interactions with different RANs, etc.), it may disable one or more cellular radios to save battery power. As another example, the UE may disable the wireless technology to search for and connect to a wireless mouse until the UE connects to a wireless keyboard. In this embodiment, the UE, from historical information, may infer that when the user connects to a wireless keyboard, the user most likely will also connect to a wireless mouse. The UE may store a history of the users' usages to run algorithms to determine the minimum connections required before enabling the UE's radio technologies for other potential connections. Further, given that certain devices have more than one key identifier, the UE may enable only the necessary radio technology with the lowest power consumption to identify unknown devices.

Also optionally, the UE may reconnect and adjust the user's environment based on the user's presence in a detected MCE (block 730). For example, in the home environment of FIG. 4, the UE may adjust the home lighting 502 or the HVAC system 503 to the user's preference. For multi-user UEs, the particular user and associated preferences may be identified using a bio sensor (e.g., fingerprint reader), manual input, or other means.

Figure 8:
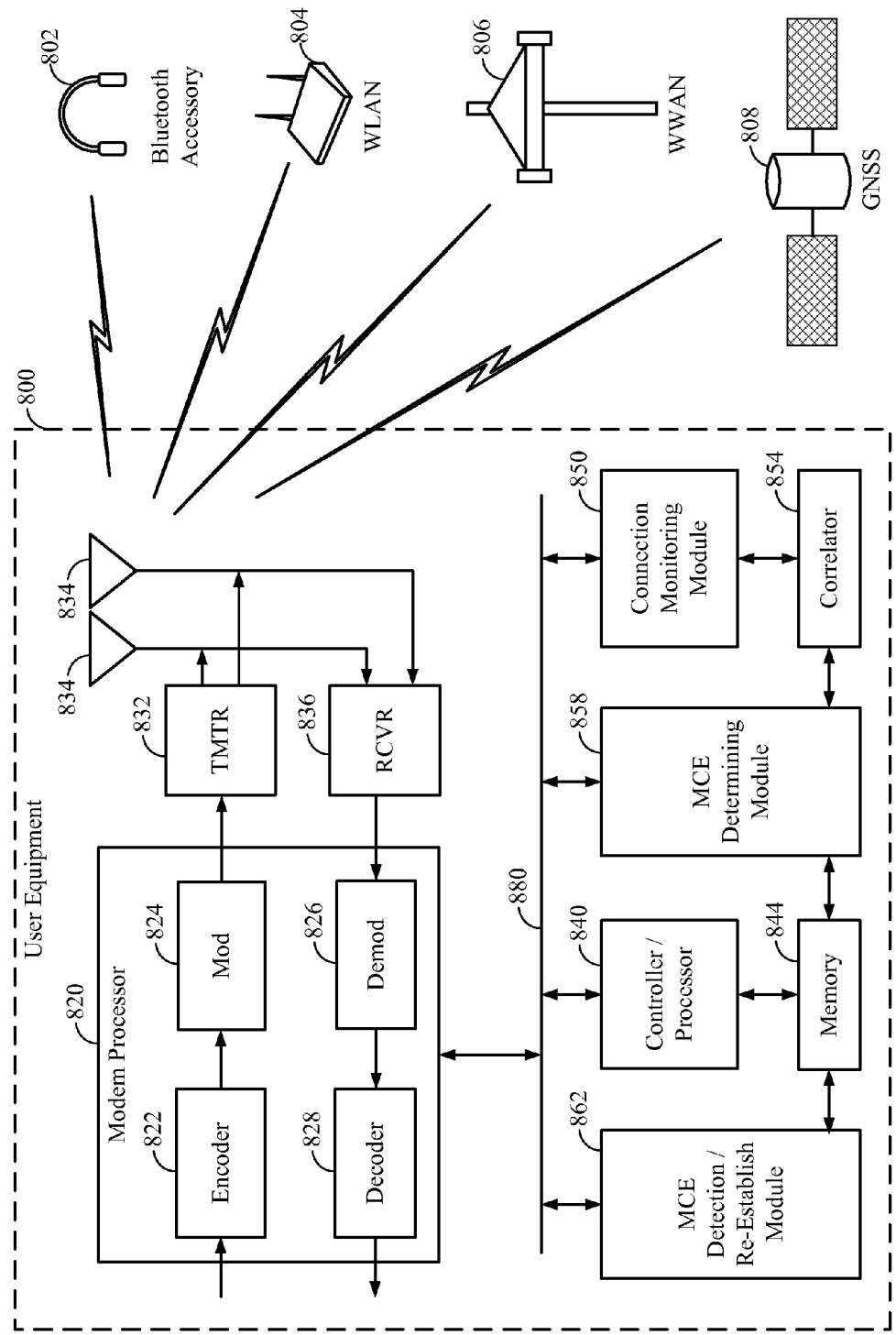
FIG. 8 illustrates an example UE configured to automatically discover and re-establish wireless connections with other devices in an MCE according to one or more embodiments.

FIG. 8 illustrates an example UE 800 configured to automatically discover and re-establish wireless connections with other devices in an MCE according to one or more embodiments. In general, the UE 800 may be capable of communicating with various accessory devices 802 (e.g., Bluetooth devices), WLANs 804 (e.g., IEEE 802.11 Wi-Fi), WWANs 806 (e.g., cellular communication systems), Global Navigation Satellite Systems (GNSSs) 808 (e.g., GPS), etc., using built-in or external hardware. Such hardware may include, for example, the illustrated antennas 834, transmitter circuitry (TMTR) 832, receiver circuitry (RCVR) 836, and a modem processor 820. The modem processor 820 may include an encoder 822, modulator 824, demodulator 826, and decoder 828. The UE 800 may also include one or more general purpose controllers or processors (illustrated in the singular as the controller/processor 840) and memory 844 configured to store related data or instructions. Together, via a bus 880, these units may perform processing in accordance with the appropriate radio technology or technologies used for communication, as well as other functions for the UE 800.

According to various embodiments, the UE 800 may further include a connection monitoring module 850 configured to monitor connections of the UE 800 with different devices (e.g., with the accessory devices 802, WLANs 804, WWANs 806, GNSSs 808, etc.), and a correlation module 854 configured to correlate the connections of the different devices. The UE 800 may also include an MCE determination module 858 configured to determine an MCE based on the correlations, and to store information associated with the MCE in the memory 844. In this design, the UE 800 additionally includes an MCE detection and re-establishment module 862 configured to automatically detect a known MCE based on an identification of at least one of the different devices, for example, and to automatically re-establish a connection with one or more of the different devices to re-establish the MCE based on the stored information in the memory 844. It will be appreciated that, in some designs, the functionality of one or more of the connection monitoring module 850, correlation module 854, MCE determination module 858, or MCE detection and re-establishment module 862 may be integrated directly into, or otherwise performed by, the general purpose controller/processor 840 of the UE 800.

Accordingly, with context-aware mobile computing, a UE in accordance with one of the embodiments herein is provided with the ability to detect, interpret, and respond to aspects of a user's local environment. Context-aware UEs may dynamically change or adapt a system based on the context of the environment. A context-aware UE may monitor input from environmental sensors and automatically react accordingly. As a result, context-aware UEs allow end users to seamlessly interact with a user's local environment.

It will be appreciated that the techniques described above may be employed in connection with numerous other general purpose environments. The work, home, car, and conference room examples are only examples of potential suitable MCEs and are not intended to suggest any limitation as to the scope of the use or functionality of the invention. Neither should these MCEs be interpreted as having any dependency or requirement relating to any one or combination of components illustrated in the figures.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor may read information from, and write information to, the storage medium. In the alternative, the storage medium may be integral to the processor.

Accordingly, an embodiment of the invention may include a computer readable medium embodying a method for connecting a user equipment. Accordingly, the invention is not limited to merely the illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for connecting user equipment (UE) comprising:
monitoring connections of different devices with the UE;
correlating a previous connection between the UE and a first device that uses a first wireless technology with a previous connection between the UE and a second device that uses a second wireless technology;
determining a mobile computing environment (MCE) based on the correlation;
storing information associated with the MCE;
automatically detecting the first device in the MCE based on a device identification number;
automatically re-establishing a connection with the second device in the MCE, using the second wireless technology, in response to detecting the first device that uses the first wireless technology that is different than the second wireless technology; and
disabling at least one radio-frequency (RF) device on the UE based on historical information for the MCE.

2. The method of claim 1, wherein the device identification number comprises a MAC address, device ID, Bluetooth device address, network SSID, IP address, or cell tower address.

3. The method of claim 1, wherein the correlating further comprises:
obtaining historical information regarding the connections with the different devices.

4. The method of claim 1, further comprising:
determining the MCE based on GPS location and/or other location based services.

5. The method of claim 1, wherein the monitoring connections of different devices with the UE comprises monitoring a first connection with the UE and a second connection with the UE; and
wherein the correlating the connections of the different devices comprises correlating the first connection with the second connection.

6. The method of claim 1, further comprises adjusting lighting in a location, after the automatic re-establishing, in response to detecting the first device.

7. User equipment (UE) comprising:
logic configured to monitor connections of different devices with the UE;
logic configured to correlate a previous connection between the UE and a first device that uses a first wireless technology with a previous connection between the UE and a second device that uses a second wireless technology;
logic configured to determine a mobile computing environment (MCE) based on the correlation;
memory configured to store information associated with the MCE;
logic configured to automatically detect the first device in the MCE based on a device identification number;
logic configured to automatically re-establish a connection with the second device in the MCE, using the second wireless technology, in response to detecting the first device that uses the first wireless technology that is different than the second wireless technology; and
logic configured to disable at least one radio-frequency (RF) device on the UE based on historical information for the MCE.

8. The UE of claim 7, wherein the device identification number comprises a MAC address, device ID, Bluetooth device address, network SSID, IP address, or cell tower address.

9. The UE of claim 7, wherein the logic configured to correlate comprises:
logic configured to obtain historical information regarding the connections with the different devices.

10. The UE of claim 7, further comprising:
logic configured to determine the MCE based on GPS location and/or other location based services.

11. An apparatus for connecting user equipment (UE), comprising:
means for monitoring connections of different devices with the UE;
means for correlating a previous connection between the UE and a first device that uses a first wireless technology with a previous connection between the UE and a second device that uses a second wireless technology;
means for determining a mobile computing environment (MCE) based on the correlation;
means for storing information associated with the MCE;
means for automatically detecting the first device in the MCE based on a device identification number;
means for automatically re-establishing a connection with the second device in the MCE, using the second wireless technology, in response to detecting the first device that uses the first wireless technology that is different than the second wireless technology; and
means for disabling at least one radio-frequency (RF) device on the UE based on historical information for the MCE.

12. The apparatus of claim 11, wherein the device identification number comprises a MAC address, device ID, Bluetooth device address, network SSID, IP address, or cell tower address.

13. The apparatus of claim 11, wherein the means for correlating comprises:
means for obtaining historical information regarding the connections with the different devices.

14. The apparatus of claim 11, further comprising:
means for determining the MCE based on GPS location and/or other location based services.

15. A non-transitory computer-readable storage medium containing instructions stored thereon, which, when executed by at least one processor causes the at least one processor to perform operations for connecting user equipment (UE), the instructions comprising:
instructions to monitor connections of different devices with the UE;
instructions to correlate a previous connection between the UE and a first device that uses a first wireless technology with a previous connection between the UE and a second device that uses a second wireless technology; and
instructions to determine a mobile computing environment (MCE) based on the correlation;

instructions to store information associated with the MCE;

instructions to automatically detect the first device in the MCE based on a device identification number;

instructions to automatically re-establish a connection with the second device in the MCE, using the second wireless technology, in response to detecting the first device that uses the first wireless technology that is different than the second wireless technology; and instructions to disable at least one radio-frequency (RF) device on the UE based on historical information for the MCE.

16. The non-transitory computer-readable storage medium of claim 15, wherein the instructions to correlate comprise:

instructions to obtain historical information regarding interactions and connections with the different devices.

17. The non-transitory computer-readable storage medium of claim 15, further comprising:

instructions to determine the MCE based on GPS location and/or other location based services.

* * * * *